(12) United States Patent
Qin et al.

(10) Patent No.: US 10,270,975 B2
(45) Date of Patent: Apr. 23, 2019

(54) PREVIEW IMAGE DISPLAY METHOD, APPARATUS AND STORAGE MEDIUM

(71) Applicant: Xiaomi Inc., Beijing (CN)

(72) Inventors: Qiuping Qin, Beijing (CN); Zhijun Chen, Beijing (CN); Baichao Wang, Beijing (CN)

(73) Assignee: XIAOMI INC., Beijing (CN)

( * ) Notice: Subject to any disclaimer, the term of this patent is extended or adjusted under 35 U.S.C. 154(b) by 0 days.

(21) Appl. No.: 15/254,689

(22) Filed: Sep. 1, 2016

(65) Prior Publication Data

US 2017/0155849 A1     Jun. 1, 2017

(30) Foreign Application Priority Data

Nov. 30, 2015   (CN) .......................... 2015 1 0853900

(51) Int. Cl.
| | | |
|---|---|---|
| *H04N 5/232* | (2006.01) | |
| *G06K 9/00* | (2006.01) | |
| *H04N 5/265* | (2006.01) | |
| *H04N 5/272* | (2006.01) | |

(52) U.S. Cl.
CPC ..... *H04N 5/23293* (2013.01); *G06K 9/00228* (2013.01); *H04N 5/23219* (2013.01); *H04N 5/23222* (2013.01); *H04N 5/23296* (2013.01); *H04N 5/265* (2013.01); *H04N 5/272* (2013.01)

(58) Field of Classification Search
CPC .......... H04N 5/23219; H04N 5/23293; H04N 5/23222; H04N 5/23296; H04N 5/265; H04N 5/272; G06K 9/00228

USPC ........... 348/333.11, 333.01, 211.99, 240.99, 348/240.1, 240.2, 333.02; 382/118, 189,
(Continued)

(56) References Cited

U.S. PATENT DOCUMENTS

| | | |
|---|---|---|
| 2004/0145670 A1 | 7/2004 | Hong |
| 2005/0046730 A1 | 3/2005 | Li |
| 2007/0098396 A1 | 5/2007 | Watanabe et al. |

(Continued)

FOREIGN PATENT DOCUMENTS

| | | |
|---|---|---|
| CN | 1517952 A | 8/2004 |
| CN | 101115148 A | 1/2008 |

(Continued)

OTHER PUBLICATIONS

Extended European Search Report dated Apr. 6, 2017 for European Application No. 16165860.4, 8 pages.
(Continued)

*Primary Examiner* — Marly S Camargo
(74) *Attorney, Agent, or Firm* — Brinks Gilson & Lione

(57) ABSTRACT

Preview images and alternate enlarged facial preview images may be displayed in a camera display screen or viewfinder prior to shooting a picture. When an image captured by a camera during a first time duration includes a human face, a face from an image captured by the camera during a second time duration may be enlarged and displayed as an alternate preview image in the viewfinder. An instruction to shoot an image may be received and the camera may shoot or save an image captured by the camera according to the shooting instruction. The alternate preview image including the facial enlargement may be used in conjunction with use of a selfie stick to aid users looking at a distant viewfinder at the end of the selfie stick.

14 Claims, 15 Drawing Sheets

(58) Field of Classification Search
USPC .......... 382/214; 396/296, 76, 373, 379, 290; 345/671
See application file for complete search history.

(56) References Cited

U.S. PATENT DOCUMENTS

| | | |
|---|---|---|
| 2008/0024643 A1 | 1/2008 | Kato |
| 2008/0205869 A1 | 8/2008 | Nose |
| 2010/0007769 A1 | 1/2010 | Chiang |
| 2010/0149402 A1 | 6/2010 | Aoki et al. |
| 2010/0180222 A1 | 7/2010 | Otsuka et al. |
| 2010/0194927 A1* | 8/2010 | Nose .................. H04N 5/263 348/240.2 |
| 2010/0272368 A1 | 10/2010 | Su et al. |
| 2011/0199502 A1 | 8/2011 | Okamura |
| 2011/0273470 A1 | 11/2011 | Ohba et al. |
| 2014/0176775 A1 | 6/2014 | Ichikawa et al. |
| 2015/0029347 A1 | 1/2015 | Tsubusaki |
| 2015/0125128 A1 | 5/2015 | Akita et al. |
| 2015/0296317 A1 | 10/2015 | Park et al. |

FOREIGN PATENT DOCUMENTS

| | | |
|---|---|---|
| CN | 101211412 A | 7/2008 |
| CN | 101626458 A | 1/2010 |
| CN | 101873426 A | 10/2010 |
| CN | 103747359 A | 4/2014 |
| CN | 103888665 A | 6/2014 |
| CN | 103945121 A | 7/2014 |
| CN | 104506721 A | 4/2015 |
| CN | 104519261 A | 4/2015 |
| CN | 104994303 A | 10/2015 |
| EP | 2 200 275 A2 | 6/2010 |
| JP | 2005-102175 A | 4/2005 |
| JP | 2008-017166 A | 1/2008 |
| JP | 2008-028959 A | 2/2008 |
| JP | 2008-278458 A | 11/2008 |
| JP | 2010-050876 A | 3/2010 |
| JP | 2011-166641 A | 8/2011 |
| KR | 10-2006-0086808 A | 8/2006 |
| KR | 10-2010-0070675 A | 6/2010 |

OTHER PUBLICATIONS

Office Action dated May 17, 2017 for Korean Application No. 10-2016-7008484, 28 pages.
International Search Report dated Aug. 29, 2016 for International Application No. PCT/CN2015/099611, 11 pages.
International Preliminary Report on Patentability dated Jun. 5, 2018 for International Application No. PCT/CN2015/099611, 8 pages.
Office Action dated Jul. 25, 2018 for Chinese Application No. 201510853900.5, 5 pages.
Examination Report dated Dec. 21, 2018 for European Application No. 16165860.4, 6 pages.

* cited by examiner

PREVIEW IMAGE DISPLAY METHOD, APPARATUS AND STORAGE MEDIUM

CROSS-REFERENCE TO RELATED APPLICATIONS

This application claims priority to Chinese Patent Application No. 201510853900.5, filed on Nov. 30, 2015, which is incorporated herein by reference in its entirety.

TECHNICAL FIELD

The present disclosure is related to communication technologies, and more particularly, to a preview image display method, apparatus and storage medium.

BACKGROUND

With the popularization of digital cameras and smart cell phones in recent years, shooting pictures using cameras or cell phones has become a habit for many people. In particular, as the mobile device usage increases people are becoming more dependent on mobile terminals such as cell phones and tablet computers to record activity occurring around them and to share their recorded images or videos on the Internet. The appearance of selfie sticks makes taking selfie pictures more convenient. People can easily capture selfie images from several angles using a selfie stick and as a result, compositions in selfie pictures are becoming more diverse. Selfie sticks have swept the world in a short time period and have provided users and tourists a valuable edge when taking selfie pictures.

When using a selfie stick to shoot a picture and attempting to capture a subject or composition over a larger area, the user or photographer may need to extend the selfie stick in order to place the camera further away from their eyes. The increased distance between the shooting device and the user's eyes may make it harder for the user to view details in a preview image of a display screen or viewfinder on the image capture device. Unfortunately, when selfie sticks are greatly extended, users may not be able to clearly see themselves in the preview image on a display screen of the distant image capture device.

SUMMARY

A camera, or any suitable image capturing device, may provide a display or view finder for previewing an image to be captured and stored to long term memory by the camera. A user may compose a picture in the in the preview display and then shoot or snap the picture to save the image shown in the display to long term memory.

A method is provided for previewing a digital image in a display or view finder. The method may include a method, comprising: during a first time duration, determining whether a preview image captured by a camera in a display screen includes a human face, during a second time duration, enlarging a face from the preview image and displaying the facial enlargement as alternate preview image on the display screen, where the second time duration may be continuous with the first time duration. Also, a picture shooting instruction may be received and an image captured by the camera may be recorded in response to the shooting instruction.

In another aspect, a preview image display apparatus may include a first determining module configured to determine whether an image captured by a camera during a first time duration includes a human face. A first enlarging module may be configured to enlarge a human face from an image captured by the camera during a second time duration which may be continuous with the first time duration. A first displaying module may be configured to display an image with the enlarged human face as a preview image on a display screen. A shooting module may be configured to receive a shooting instruction, and as a result, shoot an image captured by the camera in response to the shooting instruction. A captured image may appear on an interface of the video camera. An image may be shot when a camera button is activated or clicked. The image that is shot may be a new image in the view finder.

In another third aspect of the embodiments of the present disclosure, there is provided a terminal device comprising: a camera configured to capture an image, a display screen configured to display the image, a processor and a memory. The memory may store an instruction executable by the processor. The processor may be configured to determine that an image captured by a camera during a first time duration includes a human face, enlarge a human face from an image captured by the camera during a second time duration that may be continuous with the first time duration, display an image including the enlarged human face as a preview image on the display screen and receive a shooting instruction and shoot or save in long term memory, an image captured by the camera in response to the shooting instruction.

In another aspect, a non-transitory computer-readable storage medium may store instructions that, when executed by a processor of a mobile terminal, may cause the mobile terminal to display a preview image by determining that an image captured by a camera in the mobile terminal includes a human face during a first time duration, enlarging a human face in an image captured by the camera in during a second time duration that may be continuous with the first duration, and displaying an image of the enlarged human face image as a preview image on a display screen. The mobile terminal may receive a picture or video shooting instruction and may shoot or save to long term memory an image captured by the camera in response to the shooting instruction.

It should be understood that both the foregoing general description and the following detailed description are exemplary and explanatory only and are not restrictive of the invention.

BRIEF DESCRIPTION OF THE DRAWINGS

The accompanying drawings, which are incorporated in and constitute a part of this specification, illustrate embodiments consistent with the invention and, together with the description, serve to explain the principles of the invention.

DETAILED DESCRIPTION

Reference will now turn to embodiments of the disclosure. The following description refers to the accompanying drawings in which the same numbers in different drawings represent the same or similar elements unless otherwise presented. The embodiments set forth in the following description do not represent all embodiments consistent with the invention. Instead, they are merely examples of apparatuses and methods consistent with aspects related to the invention as recited in the appended claims.

Figure 1A:
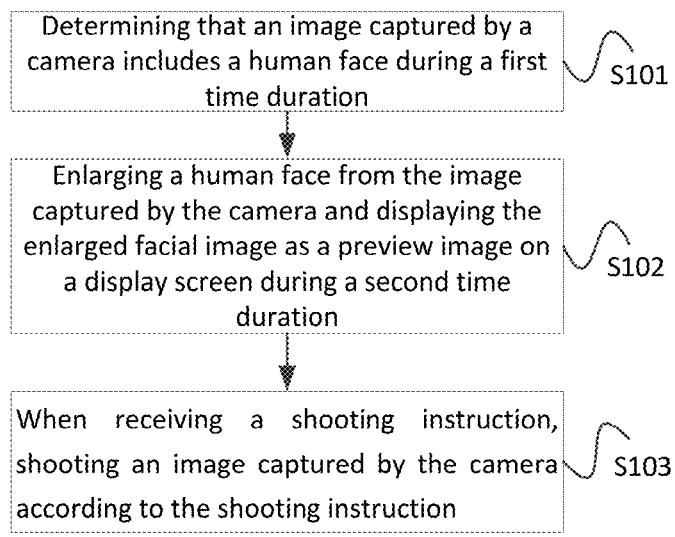
FIG. 1A is a flow chart illustrating exemplary steps for displaying a preview image according to an embodiment of the disclosure.

FIG. 1A is a flow chart illustrating exemplary steps for displaying a preview image according to an embodiment of the disclosure. The method includes steps performed by a terminal device, for example, a still or video camera that has an image shooting function. The shooting function may refer to saving an image to memory in response to a user or automated system activating an input mechanism, for example, a user snapping a picture or taking a video with the camera. A captured image may be received via an optical system by any suitable image sensor and may be processed, for example, with various types of filtering. The captured image may be displayed in the camera's display screen or viewfinder as a preview image, and the captured image data may be saved to memory. A user may "snap" the picture or activate an input mechanism to initiate the "shooting" function. The image shooting function may save a digital image, photograph or video to memory for future use. The terminal device may be any suitable image or video capturing device, for example, a smart cell phone, a digital camera, a tablet computer or the like, and may be referred to as a camera, a mobile device, a terminal or image capturing device, for example.

Referring to FIG. 1A, a method for displaying a preview image may include the following exemplary steps S101-S103.

S101: determine whether an image captured by a camera during a first time duration includes a human face.

The method for displaying a preview image may be helpful when shooting a photograph or scene using a selfie stick. The method may include a preview image automatic switch mode, in which a display screen of the camera alternately displays an image including an enlargement of at least one human face and an image of original scale or size with at least one human face included somewhere in the frame of the image. When a shooting function is activated in a camera or terminal device, the camera may capture images during a first time duration and display the captured images as preview images on a display screen. The terminal device or camera may detect whether the images captured by the camera during the first time duration include a human face. The first time duration may be set by a user, for example, for one or two seconds, however, the disclosure is not limited with respect to any specific time duration or method of setting the time duration. The terminal device may use any suitable face recognition technology to determine whether the captured preview images include a human face.

In some embodiments, when a user captures images using a selfie stick, the preview image automatic switch mode may be initiated manually by a user or may be automatically started when the device that captures the images and detects that the selfie stick is being utilized or is attached. When images are captured using a selfie stick, the selfie stick and image capturing device, for example, a cell phone or camera may be connected by wire or communicate wirelessly. A wireless connection may include a Bluetooth connection, and a wired connection may include connecting the image capturing device and the selfie stick using a data line. When a connection is made using a data line, after the image capturing device detects that a USB interface is connected, the image capturing device may recognize a connected device as a selfie stick. If the connected device is recognized as a selfie stick, the preview image automatic switch mode in the image capture device may be activated. In instances when a wireless connection is used, the image capturing device may determine that a connected device is a selfie stick utilizing Bluetooth matching and the preview image automatic switch mode may be initiated in the image capturing device.

S102: enlarge at least one human face from an image captured by the camera during a second time duration and display an image including the enlargement of the at least one human face as a preview image on a display screen.

The camera may continue to capture images. During the second time duration, the camera may perform human face recognition on each frame of the captured images and a recognized or detected human face may be enlarged to occupy an area of a target size. The target size may be set according to a size of the display screen of the image capturing device. Moreover, the enlarged human face may be displayed as a preview image. The image capturing device may enlarge and display the facial preview images frame by frame. A face from an image may be placed within a smaller rectangular area, which may be proportional to the image aspect ratio that the smaller rectangular area may be enlarged or zoomed into a full size image. In one example, one face from an image may be copied and placed within a smaller rectangular area that has an aspect ratio proportional to the original image. The smaller rectangular area may be enlarged or zoomed to a full size image in the preview image. In some embodiments, the second time duration may be preset or configured by a user. The image capturing device may provide several time duration settings for a user to select from, for example, 1 second, 1.5 seconds and 2 seconds. However, the disclosure is not limited in this regard. The second time duration may be controlled based on a timer within the image capture device, where a time period for the second time duration may be set on the timer. The second time duration may be continuous with the first time duration that may also be based on period of time set on a timer.

In some embodiments, when a human face is detected within an original or whole preview image, the image capturing device may exit a display interface or display mode in which the original whole preview image is displayed, and may enter into a human face enlargement mode and display a human face from the original preview image, which has been enlarged, as a new preview image on the full display screen. In another embodiment, the enlarged image of the human face and the original whole preview image may be displayed simultaneously in a picture-in-picture manner. For example, while the enlarged human face is displayed on the full display screen, the original whole view preview image may be reduced and displayed on a smaller portion of the display screen using another image preview display interface. In some embodiments, the original whole view preview image display interface may be located at a corner of the display screen, and may have a much smaller size than that of the entire display screen area so as not to detract from the display of the enlarged human face preview image.

One use case for enlarging a human face in an alternate image preview is to allow a user to see himself or herself clearly when taking a selfie. For example, when using an extended selfie stick to take a picture with background scenery included in the layout of a frame to be captured, the faces in the picture may appear so small in the image preview that they may be difficult for a user to see from the other end of the extended selfie stick. By enlarging the user's face in an alternate preview the user may be able to see his or her face more clearly and may be able to better decide when to take the picture.

S103: when receiving a shooting instruction, shoot an image captured by the camera according to the shooting instruction. A shooting instruction may trigger storage of an image that is displayed in the preview image, for example, to long term memory for future use.

A user may be able to more clearly see the details of his or her face in an alternate preview image that includes an enlargement of his or her face. When the user is satisfied with his or her current face image in the alternate preview, the user may activate a shooting mechanism or take a snap shot within the second time duration. If the user is not satisfied with his or her current face image in the alternate preview, the user may adjust his or her position and/or facial expression, for example. The display screen may alternate between displaying the facial enlargement preview images and whole scene original image captured images so that the user can more clearly the details of his or her face and make adjustments over time until the user is satisfied with their facial image and presses the shooting mechanism to take a picture. Once the picture is taken the picture including a full scene may be saved to long term memory, printed or transmitted to another device, for example.

In operation, during a first time duration, a camera may detect that a full scene image captured by the camera and presented in the camera's display screen or view finder includes a face. During a second time duration, the camera may enlarge a human face from a captured full scene image and display the enlarged human facial image as an alternate preview image on the display screen. The camera may receive a shooting instruction, and may shoot or save an image captured by the camera in response to the shooting instruction. In some instances the image that is shot or saved by the camera may be a full scene image corresponding to an enlarged facial image that was shown in the camera's display screen. The method may allow a user to clearly see the details of his or her face when shooting a picture with a camera display at an extended distance when using a selfie stick.

Figure 1B:
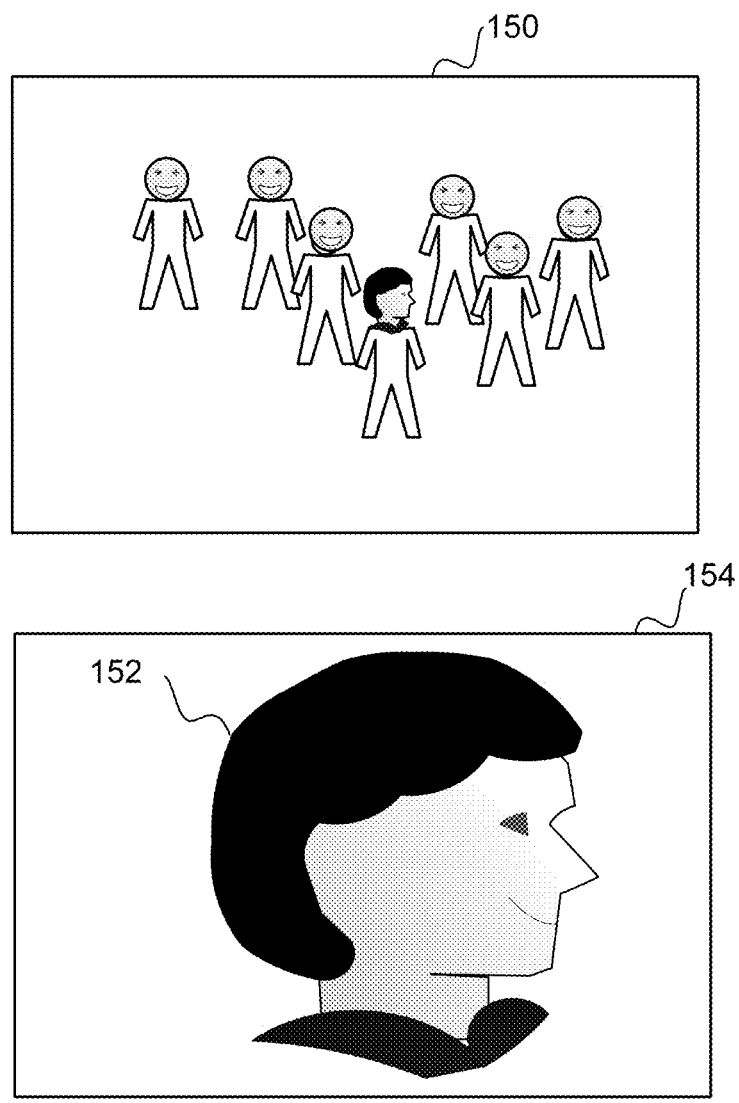
FIG. 1B is an illustration representing a preview image including human faces and an alternate preview image including an enlargement of a human face.

FIG. 1B is an illustration representing a preview image including human faces and an alternate preview image including an enlargement of a human face.

FIG. 1B includes an original captured image 150, an alternate preview image 154, and an image of a facial enlargement 152.

The captured image 150 may be displayed in a camera's display screen or viewfinder as a preview image prior to a user activating a shooting mechanism to save the image as a photograph or video frame for future use. The original captured image 150 may include a full scene or composition and may include at least one or more images of a human face. One or more of the faces within the original captured image 150 may be selected to be enlarged and displayed in one or more alternate preview images in the camera's display screen or view finder.

The alternate preview image 154 may include the image of a facial enlargement 152 that may include an enlargement of one or more of the human faces from the original captured image 150. The image of the facial enlargement 152 may be displayed in the camera's display screen or viewfinder as an alternate preview image relative to the original captured image 150.

Figure 2:
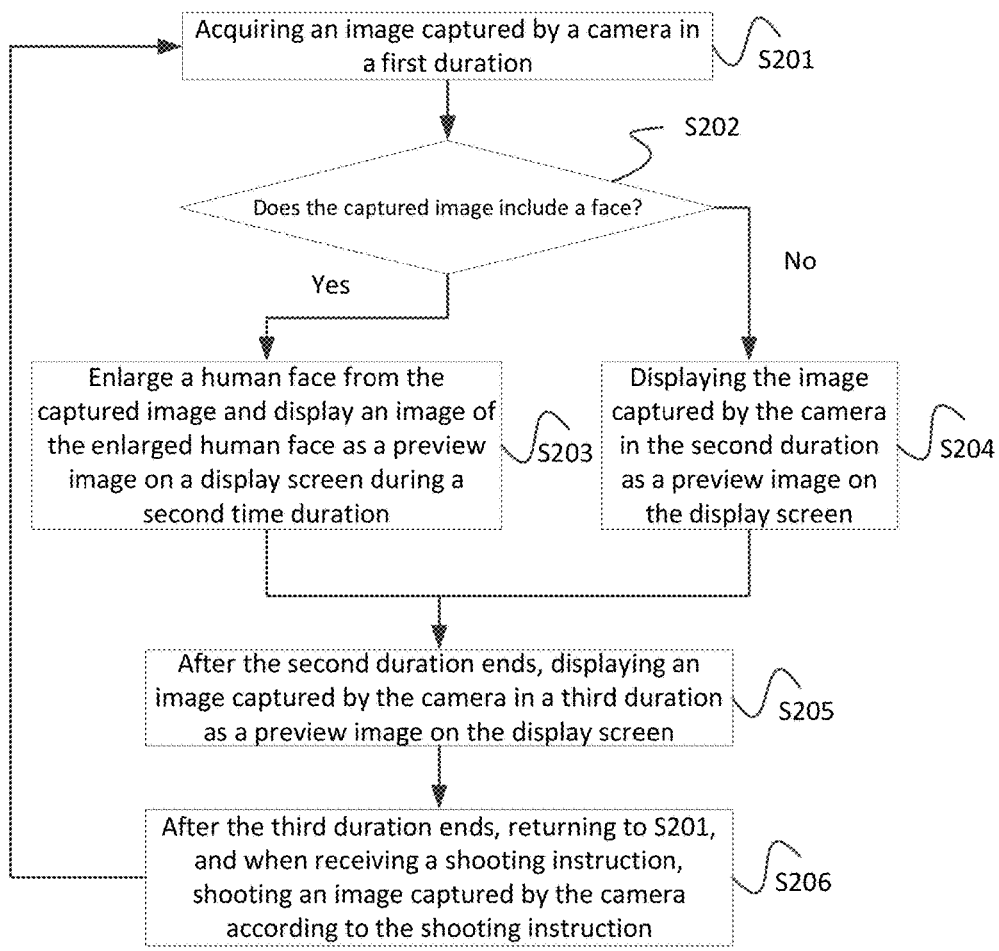
FIG. 2 is a flow chart illustrating exemplary steps for displaying a preview image according to an embodiment of the disclosure.

FIG. 2 is a flow chart illustrating exemplary steps for displaying a preview image according to an embodiment of the disclosure. As shown in FIG. 2, the method for displaying a preview image may include the following exemplary steps S201-S206:

S201: acquire or access an image that is captured by a camera and shown in a display of the camera during a first time duration.

S202: determine whether the captured image includes a human face.

In exemplary step S201 an image preview automatic switch mode may be initiated in a camera. During a first time duration, the camera may capture full scene images framed by camera input, and may display the full scene images as preview images. In exemplary step S202, the camera may detect whether the full scene images captured by the camera include a human face. In instances when it is determined that a full scene image includes an image of a face, the exemplary steps may proceed to step 203.

S203: enlarge a human face in an image captured by the camera during a second time duration and display an image of the face enlarged as an alternate preview image on a display screen.

In instances when it is determined that the image captured by the camera during the first time duration does not include a human face, the exemplary steps may proceed to step S204 is executed.

S204: display the image captured by the camera during the second time duration as a preview image on the display screen.

In instances when it is determined that the full scene image captured by the camera during the first time duration does not include a human face, it may be unnecessary to enlarge the image, and the original full scene image captured by the camera may be directly displayed as a preview image on the display screen during the second time duration.

S205: after the second time duration, in a third time duration, an image captured by the camera may be displayed as a preview image on the display screen.

Step S205 may be executed after steps S203-S204. The camera, which may refer to a device that includes a camera, may determine when the end of the second time duration occurs. For example, the camera may have a timer set for a specified time period. When the time period has completed, the second time duration may end. The camera may continue to capture images during a third time period. The camera may display an image captured by the camera during the third time duration as a preview image on the display screen. The image captured by the camera during the third time duration may not be enlarged. In some embodiments, the image displayed during the third time duration may be the same full scene image that was captured and displayed as a preview image during the first time duration in step S201. In other embodiments the image displayed during the third time duration may be a current or live full scene image captured after the facial enlargements are displayed during the second time duration in step S203. The third time duration may be continuous relative to the second time duration. In some embodiments, the second and third time durations may be equal, however, the disclosure is not limited in this regard and the second and third time durations may not be equal.

The human face detected from the full scene captured image may be enlarged in S203 so that the user can clearly see himself or herself in a viewfinder or camera display. After the user clearly sees an image of himself or herself in the enlarged preview image, the terminal device may again display the originally captured full scene image to the user in this step, so that the user can view the whole layout of a picture that the user may select by shooting the picture or taking a snap shot. The originally captured image refers to the image in which the human face is not enlarged.

S206: after the third duration ends and returning to the process in step S201, receiving a shooting instruction, and shooting or recording an image captured by the camera to long term memory, in response to the shooting instruction.

In this embodiment, in instances when a user shooting instruction is not input or received from the user, the terminal device may continue to execute steps S201-S206 in a looped manner. That is, full scene preview images may alternate with alternate preview images of facial enlargements derived from the full scene images in the camera display or viewfinder. In other words, after an image including an enlarged image of a human face is displayed during a second time duration, an originally captured full scene image may be displayed during a third time duration, so that the user can alternate between clearly see himself or herself in an enlargement and viewing the whole layout, repeatedly, until the user is satisfied with the image in the preview images and presses a camera picture shooting button or other type of image capture mechanism. After the camera receives the shooting instruction, the camera shoots the image captured by the camera in response to the shooting instruction. In this regard, the camera may save the captured image to long term memory, transmit the captured image to another device or print the captured image for example.

In operation, a camera may determine whether an image captured by a camera during a first time duration includes a human face. In instances when the image captured by the camera during the first time duration includes a human face, the camera may enlarge an identified face in an image captured during a second time duration. The image of the enlarged human face may be displayed by the camera as an alternate preview. In instances when the image captured by a camera during the first time duration does not include a human face, the image captured by the camera during the first time duration may be directly displayed by the camera during the second time duration as a preview. After the second time duration ends, during a third time duration, the camera may display an image captured by the camera as a preview image on the display screen. After the third time duration ends, repeating the above process until receiving a shooting instruction, and shooting an image captured by the camera in response to the shooting instruction. For example, the camera may shoot the image displayed in the view finder at the time when the shooting instruction is received or input by a user. By applying the above method, the enlarged human face image and the originally captured full scene images may be displayed alternately, so that the user may clearly see the whole layout of a full scene and details of his or her face when deciding which images to shoot when using a selfie stick.

Figure 3:
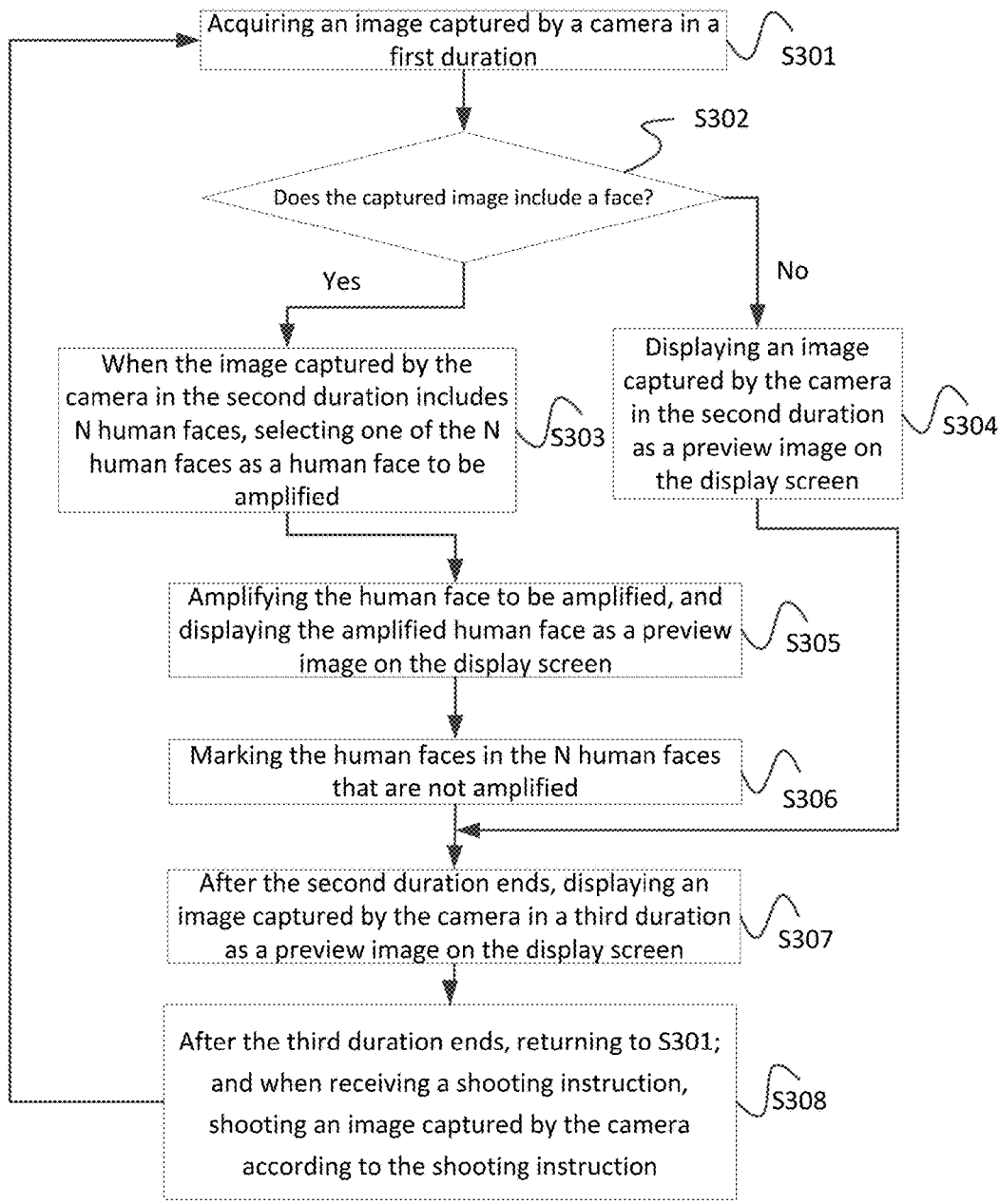
FIG. 3 is a flow chart illustrating exemplary steps for displaying a preview image according to an embodiment of the disclosure.

FIG. 3 is a flow chart illustrating exemplary steps for displaying a preview image according to an embodiment of the disclosure. Referring to FIG. 3, a method for displaying a preview image may include the following steps S301-S308.

S301: acquire an image captured by a camera during a first time duration.

S302: determine whether the image captured by the camera during the first time duration includes a human face.

In instances when it is determined in step S302 that the image captured by the camera during the first time duration includes a human face, proceed to step S303.

S303: when an image captured by the camera during a second time duration includes N human faces, select one of the N human faces as a human face to be enlarged.

The image captured by the camera may include N human faces, N being a positive integer greater than or equal to 2. A terminal device or camera may select one of the N human faces as a human face to be enlarged. The selection may be made randomly or according to a preset selection rule, for example, a rule based on a spatial area or location in the frame of each of the N human faces. After step S303, proceed to step S305.

In instances when it is determined in step S302 that the image captured by the camera during the first time duration does not include a human face, proceed to step S304.

S304: during the second time duration, display an image captured by the camera as a preview image on the display screen. After S304, proceed to step S307.

S305: enlarge the human face that was selected to be enlarged, and display the enlarged human face as a preview image on the camera display screen.

S306: mark the N human faces that are not enlarged. In some embodiments, the marking information may be kept in temporary storage. For example, the marked faces may be represented by two points in x, y coordinates that represent a rectangle or box of a face region in the image. However, the disclosure is not limited in this regard.

By marking the N faces in the captured image, the camera or terminal device may select one of the remaining N−1 faces to be enlarged, during another or next face enlargement process based on the information in the marking. By repeating this process, all of the human faces in the original captured image may be enlarged over N cycles of enlargement. In this manner, each person viewing the captured image can clearly see details of his or her face. During each enlargement cycle, the terminal device may select and enlarge a human face that has not yet been enlarged according to the face markings. In some instances the photographer may take one or more photos before all of the N enlargement cycles have completed.

S307: after the second time duration ends, a full scene image captured by the camera may be displayed as a preview image on the camera display screen during a third time duration. In some instances, the image captured during the first time duration may be displayed during the third time duration, or a current captured image may be displayed.

S308: after the third duration ends, return to the process of step S301, receive a shooting instruction and shoot an image captured by the camera according to the shooting instruction.

In operation when an image captured by a camera during a second time duration includes N human faces, select one of the N human faces to be enlarged. Enlarge the selected human face and display an image of the enlarged human face as a preview image on the camera display screen. Mark the human faces in the N human faces that are not enlarged. Based on the markings, in a second face enlargement cycle, select one human face from the remaining N−1 human faces that have not yet been selected to be enlarged and enlarge and display the selected human face. After N cycles or iterations of facial enlargement and display have been processed, each of the N faces from the full scene original captured image have been presented in an enlarged alternate preview image to the viewers, and the each of the people depicted in the image may have had a chance for improved viewing of his or her face prior to taking or recording a photo.

Figure 4:
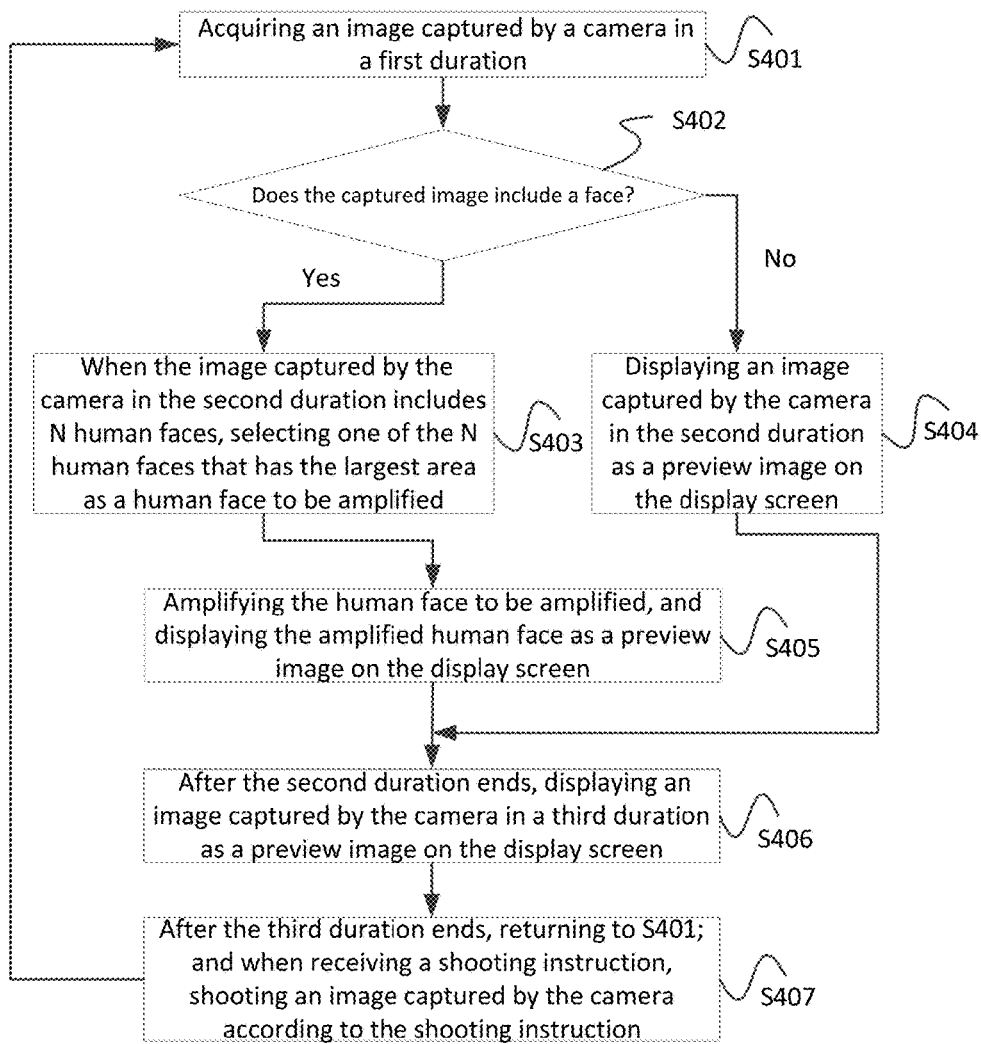
FIG. 4 is a flow chart illustrating an exemplary method for displaying a preview image according to an embodiment of the disclosure.

FIG. 4 is a flow chart illustrating exemplary steps for displaying a preview image according to an embodiment of the disclosure. As shown in FIG. 4, the method for displaying a preview image may include the following steps S401-S407.

S401: acquire an image captured by a camera during a first time duration.

S402: determine whether the image captured by the camera during the first time duration includes a human face.

In instances when it is determined in step S402 that the image captured by the camera during the first time duration includes a human face, proceed to step S403. If it is determined that the image captured by the camera in the first duration does not include a human face, step S404 is executed.

S403: when an image captured by the camera during a second time duration includes N human faces, select a face from the N human faces that has the largest spatial area as a human face to be enlarged.

The image captured by the camera during the second time duration may include N human faces, where N may be a positive integer greater than or equal to 2. The human face that has the largest spatial area may be selected from the N human faces as a human face to be enlarged. Alternatively, the terminal device or camera may select one of the N human faces as a human face to be enlarged randomly. The disclosure is not limited to any specific rule for selecting a face to be enlarged and any suitable rule may be utilized. After S403, proceed to step S405.

In instances when it is determined in step S402 that the image captured by the camera during the first time duration does not include a human face, proceed to step S404.

S404: display an image captured by the camera during the second time duration as a preview image on the display screen. After S404, proceed to step S406.

S405: enlarge the human face selected to be enlarged, and display an image of the enlarged selected human face as a preview image on the display screen.

S406: after the second time duration ends, during a third time duration display an image captured by the camera as a preview image on the display screen.

S407: after the third duration ends, return to and repeat the process of step S401.e Receive a shooting instruction and shoot an image captured by the camera in response to the shooting instruction. In some embodiments, the camera may continue to capture current images to shoot or the original image captured during the first time duration may be shot and saved.

In operation, when an image captured by a camera during the second time duration includes N human faces, a human face detected in the image that has the largest spatial area of any of the N human faces may be selected to be enlarged in an alternate image preview display. The selected face may be enlarged and displayed as a preview image on the camera display screen. When there are many human faces within a captured image, enlarging every face may take a long time. By applying this method of enlarging the human face that covers the greatest spatial area in the captured image the camera may save time so that the preview image display process is more flexible and quicker.

Figure 5:
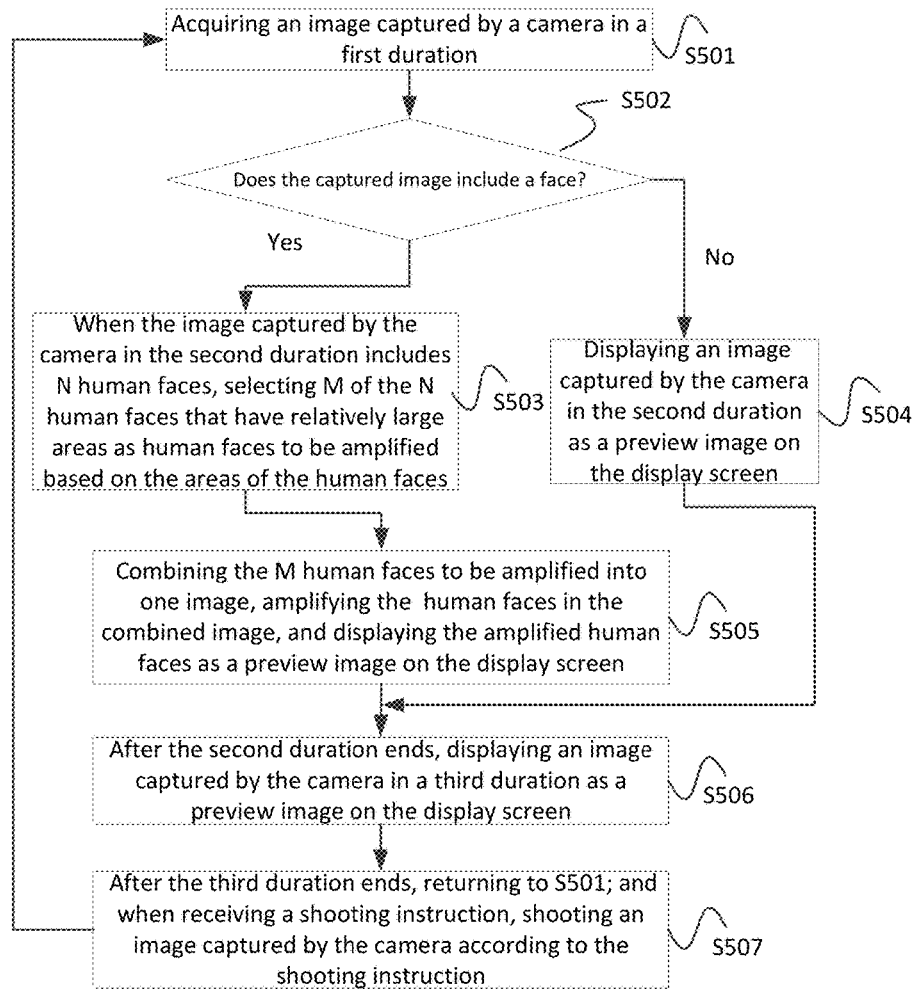
FIG. 5 is a flow chart illustrating an exemplary method for displaying a preview image according to an embodiment of the disclosure.

FIG. 5 is a flow chart illustrating exemplary steps for displaying a preview image according to another embodiment of the disclosure. The flow chart represents a preview image display method that comprises the following steps S501-S507.

S501: acquire an image captured by a camera during a first time duration.

S502: determine whether the image captured by the camera during the first time duration includes one or more human faces.

In step S502, in instances when it is determined that the image captured by the camera during the first time duration includes a human face, the exemplary steps may proceed to step S503 is executed.

S503: when the image captured by the camera during a second time duration includes N human faces, select M of the N human faces that have relatively large spatial areas as faces to be enlarged, based on spatial the areas of the N human faces. After S503, the exemplary steps may proceed to step S505.

In step S502, in instances when it is determined that the image captured by the camera during the first time duration does not include a human face, the exemplary steps may proceed to step S504.

S504: display an image captured by the camera during the second time duration as a preview image on the display screen. After step S504, the exemplary steps may proceed to step S506.

S505: combine the M human faces selected to be enlarged into one combined image and enlarge the human faces in the combined image. Display the enlarged image of the combined M human faces as a preview image on the display screen.

In this embodiment, multiple human faces from an original captured image, which may have relatively larger spatial areas, are combined into one image. The M human faces in the combined image are enlarged as a whole, and the enlarged human faces are displayed as a preview image on the camera display screen.

S506: after the second duration ends, display an image captured by the camera in a third duration as a preview image on the display screen.

S507: after the third duration ends and returning to or repeat the process of step S501. Receive a shooting instruction and shoot or save an image captured by the camera in response to the shooting instruction. The acquired image may be a live or current image shown in the preview image of the display screen.

In operation, when an image captured by a camera includes N human faces, M of the N human faces that have relatively large spatial areas may be selected to be enlarged. The M selected human faces may be enlarged and combined into one image. The enlarged and combined M faces may be displayed in a preview image on the camera display screen. In instances when there are many human faces in an image, if each face were to be enlarged one at a time it would take a longer time. By applying this method of enlarging and combining M human faces that have relatively large spatial areas from the original captured image, the time for displaying a preview image and presentation of detail in faces may be improved.

Figure 6:
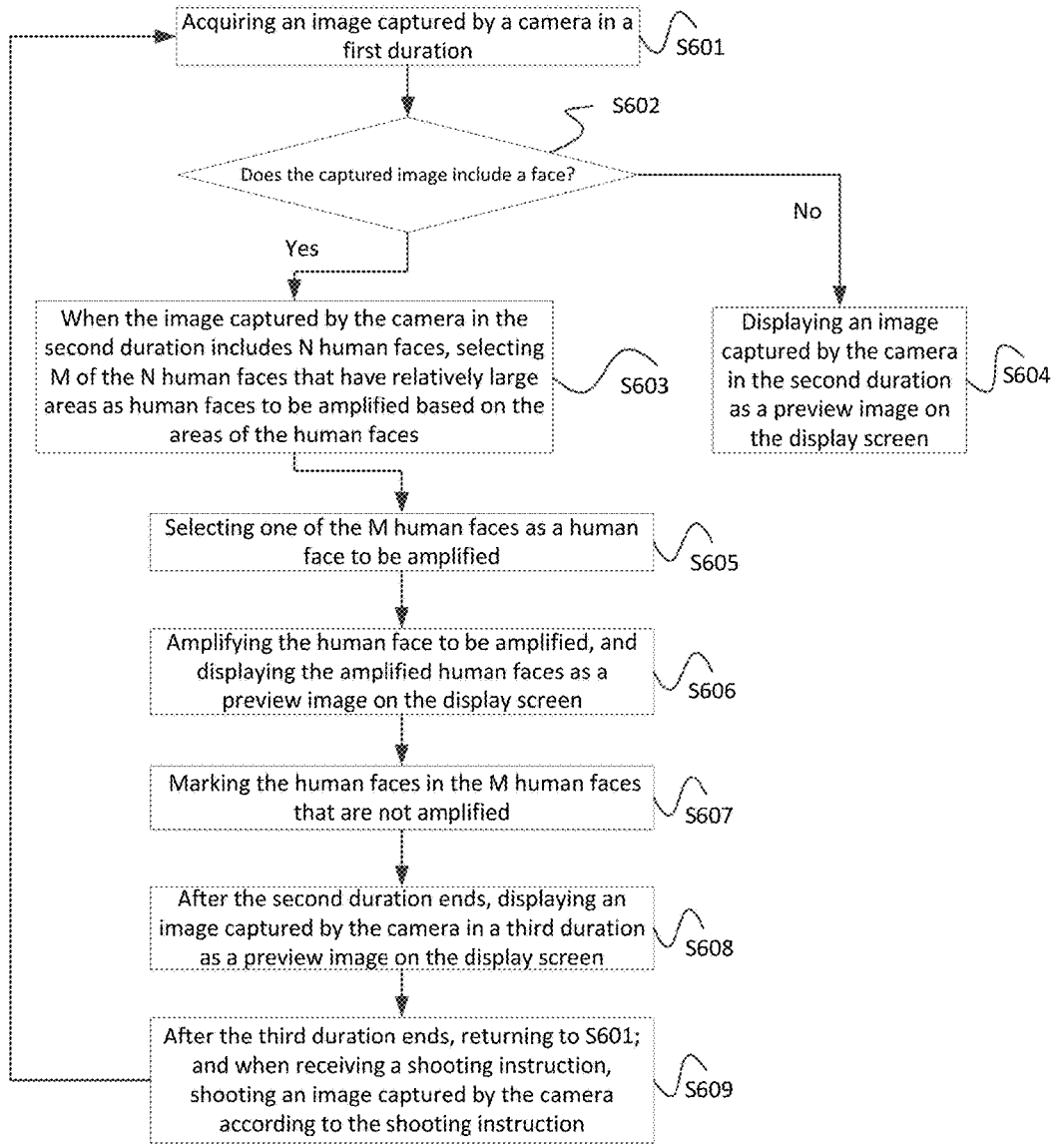
FIG. 6 is a flow chart illustrating an exemplary method for displaying a preview image according to an embodiment of the disclosure.

FIG. 6 is a flow chart illustrating exemplary steps for displaying a preview image according to an embodiment of the disclosure. Referring to FIG. 6, the method for displaying a preview image includes the following steps S601-S609.

S601: acquire an image captured by a camera during a first time duration.

S602: determine whether the image captured by the camera during the first time duration includes a human face.

In step S602, in instances when it is determined that the image captured by the camera during the first time duration includes a human face, proceed to exemplary step S603.

S603: when it is determined that the image captured by the camera during a second time duration includes N human faces, select M of the N human faces that occupy relatively large spatial areas within the frame of the captured image, based on the spatial areas occupied by each of the N human faces.

After S603, the exemplary steps may proceed to step S605.

In step S602, in instances when it is determined that the image captured by the camera during the first time duration does not include a human face, the exemplary steps may proceed to step S604.

S604: display an image captured by the camera during a second time duration as a preview image on the camera display screen.

After step S604, the exemplary steps may proceed to step S608.

S605: select one of the M human faces as a human face to be enlarged.

S606: enlarge the selected one of the M human faces and display the enlarged 1 of the M human faces as a preview image on the camera display screen.

S607: mark the human faces in the M human faces that have not been enlarged.

By marking the M human faces, the camera may select one human face at a time from the remaining M−1 human faces that have not yet been selected to be enlarged and may use the markings associated with each of the M human faces to indicate a face to be enlarged during another or next facial enlargement process. In this manner, all the M human faces may be enlarged during M facial enlargement cycles. In each enlargement cycle, the camera may select and enlarge a human face based on the markings for each of the M faces, and display an image showing the facial enlargement as a preview in the camera display.

S608: after the second time duration ends, during a third time duration an image captured by the camera may be displayed as a preview image on the display screen.

S609: after the third duration ends, return to the process of step S601.e Receive a shooting instruction and shoot an image captured by the camera in response to the shooting instruction. For example, save image data corresponding to the image displayed in the image preview, which may be the image captured during the first time duration in S601 or a new live image.

In operation, when an image captured by a camera includes N human faces, selecting M of the N human faces to be enlarged, where the M human faces occupy relatively larger spatial areas than others of the N human faces. Select one of the M human faces as a human face to be enlarged. Enlarge the selected human face and display the enlarged selected human face as a preview image on the display screen. Mark the M human faces that have not been enlarged. Using the markings, select one human face from the remaining M−1 human faces that have not yet been selected to be enlarged and enlarge this selected face in another or next enlargement process. By applying this method, M of the N people included in the captured image may see the enlarged features of their faces after M cycles of enlarging the faces. The users may use these enlarged facial images to make adjustments in their poses or the composition of a scene, even when the camera is at such a distance from the users that is difficult to see details of the image in the full scene image preview.

Figure 7:
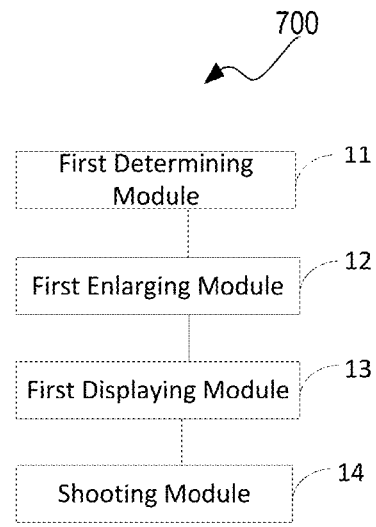
FIG. 7 is a block view of an exemplary preview image display apparatus according to an embodiment of the disclosure.

FIG. 7 is a block view showing an exemplary preview image display apparatus according to an exemplary embodiment of the disclosure. The apparatus is applied to a terminal device. As shown in FIG. 7, an apparatus 700 comprises: a first determining module 11, a first amplifying or enlarging module 12, a first displaying module 13 and a shooting module 14. The apparatus 700 may be any suitable device, for example, a still and/or video camera, a smart phone, a tablet or any device that has suitable hardware and software to capture an image or sequence of images and display one or more images in a display screen. The apparatus 700 may include a display screen or view finder operable to display a preview image. The apparatus 700 may be referred to as a camera, an image capturing device, a preview image display device or a terminal device, for example, and may be operable to perform the methods and processes described with respect to any of or all of the FIGS. 1-15.

The camera 700 may be operable to be physically attached to a selfie stick and may be communicatively coupled to the selfie stick by a wireless or wired connection. The camera 700 may be operable to communicate with the selfie stick or to sense when the selfie stick is attached. The camera 700 may activate an image enlargement mode, as described with respect to any or all of FIGS. 1-15, when the selfie stick is attached.

The first determining module 11 may be configured to determine whether an image captured by the camera 700 during a first time duration includes a human face.

The first enlarging module 12 may be configured to enlarge a human face detected in an image captured by the camera 700, during a second time duration which may be continuous with the first duration.

The first displaying module 13 may be configured to display the human face image amplified or enlarged by the first amplifying or enlarging module 12 as a preview image on a display screen of the camera 700.

The shooting module 14 may be configured to, when receiving a shooting instruction, shoot an image captured by the camera 700 in response to the shooting instruction.

In operation, during a first time duration, the first determining module 11 may detect that a full scene image, captured by the camera 700 and presented in a camera 700 display screen or view finder, includes a face. During a second time duration, the first enlarging module 12 may enlarge a human face from a captured full scene image and the first displaying module 13 may display the enlarged human facial image as an alternate preview image on a display screen of the camera 700. The camera 700 may receive a shooting instruction, and the shooting module 14 may shoot or save an image captured by the camera 700 in response to the shooting instruction. In some instances the image that is shot or saved by the camera 700 may be the original image from which the enlarged facial image was derived. Alternatively, the shot image may be taken from a live image currently displayed in the display screen. In this manner, a user may see facial details prior to shooting a picture, even when the camera 700 is extended at a distance, for example, when using a selfie stick.

Figure 8:
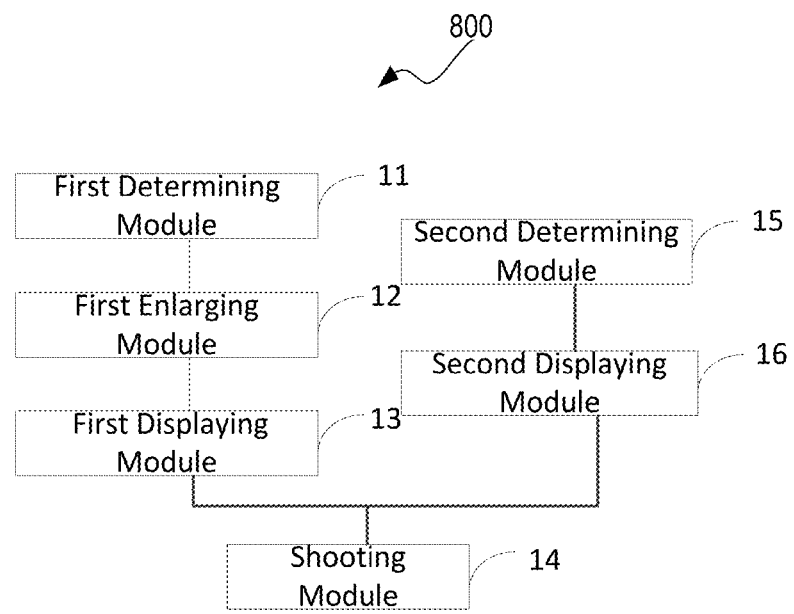
FIG. 8 is a block view of an exemplary preview image display apparatus according to an embodiment of the disclosure.

FIG. 8 is a block view of an exemplary preview image display apparatus according to an embodiment of the disclosure. Referring to FIG. 8, there is shown an apparatus 800 that may include similar or substantially the same features as the apparatus 700 described with respect to FIG. 7. The apparatus 800 may further include a second determining module 15 and a second displaying module 16.

The second determining module 15 may be configured to determine that an image captured by the camera 800 during a first time duration does not include a human face.

The second displaying module 16 may be configured to display the image captured by the camera during a second duration as a preview image on a display screen of the camera 800.

Figure 9:
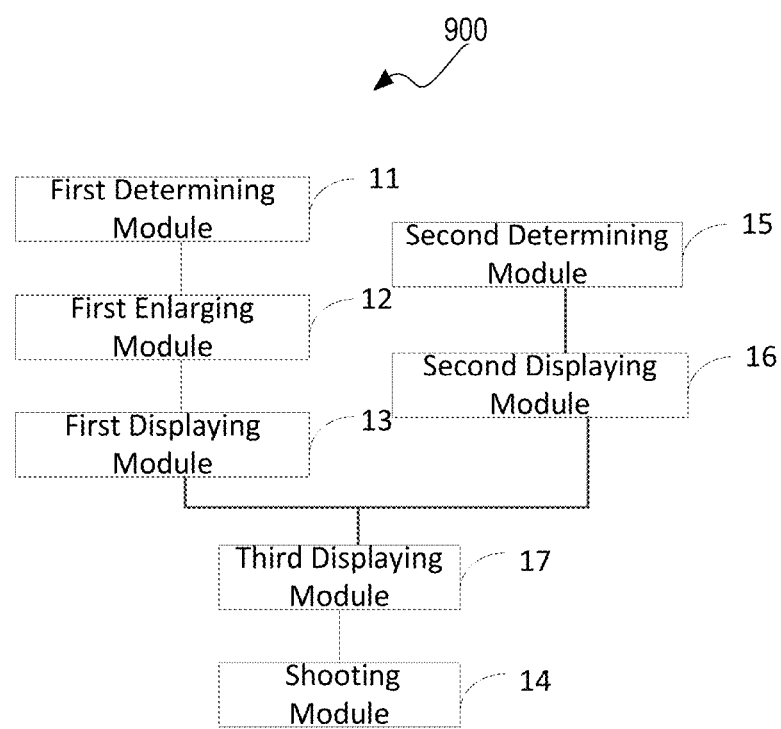
FIG. 9 is a block view of an exemplary preview image display apparatus according to an embodiment of the disclosure.

FIG. 9 is a block view of an exemplary preview image display apparatus according to an embodiment of the disclosure. Referring to FIG. 9, there is shown an apparatus 900 that may be similar or substantially the same as the apparatus 700 and/or 800 described with respect to FIGS. 7 and 8. The apparatus or camera 900 may further comprise a third displaying module 17.

The third displaying module 17 may be configured to, after the second time duration ends, display an image captured by the camera 900 during a third duration as a preview image on a display screen of the camera 900. The third time duration may be continuous with the second time duration. The image displayed by the third displaying module 17 may include a live or current image captured during the third time duration after displaying the enlarged facial images.

Figure 10:
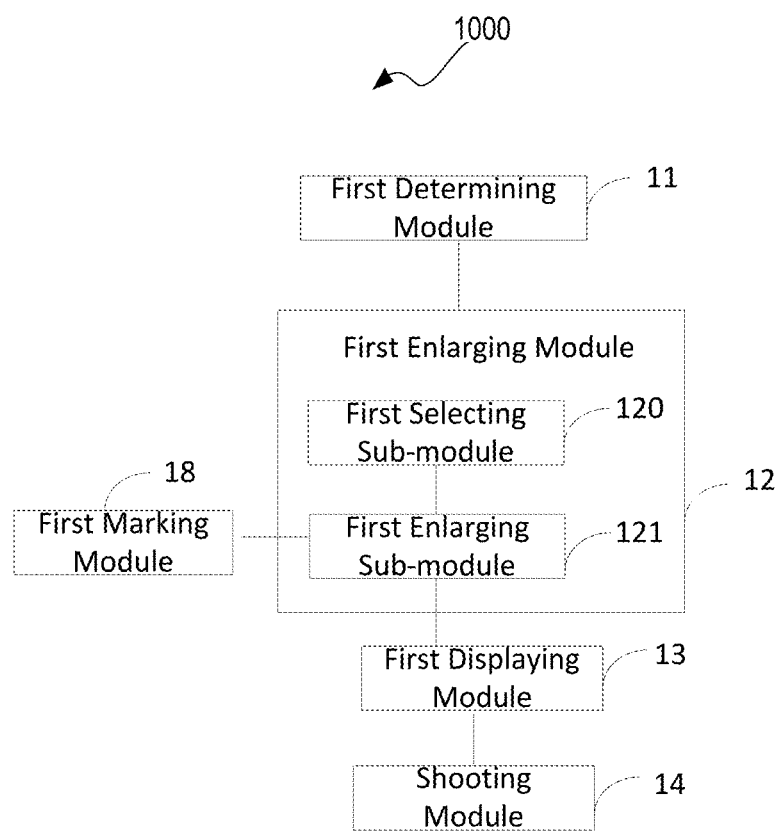
FIG. 10 is a block view of an exemplary preview image display apparatus according to an embodiment of the disclosure.

FIG. 10 is a block view of an exemplary preview image display apparatus according to an embodiment of the disclosure. Referring to FIG. 10, there is shown an apparatus or camera 1000 that may be similar or substantially the same as any of the apparatuses 700, 800 and 900 described with respect to FIGS. 7, 8 and 9. In this embodiment, the image captured by the camera in the second duration includes N human faces, N being a positive integer greater than or equal to 2. The camera 1000 may include the first enlarging or amplifying module 12 that may further include a first selecting sub-module 120 and a first enlarging or amplifying sub-module 121. The camera 1000 may also include a first marking module 118.

An image captured by the camera 1000, or by any of the cameras described herein, may include a plurality of faces. The first determining module 11 may locate the plurality of faces within the captured image, using any suitable face recognition or detecting technology, and may determine the number of faces and the spatial area or relative spatial area occupied by each of the plurality of faces. The number of the plurality of faces within the captured image may be represented by N, where N is a positive integer greater than or equal to 2.

The first selecting sub-module 120 may be configured to select one of the N human faces as a human face to be enlarged or amplified.

The first enlarging sub-module 121 may be configured to enlarge the human face selected to be enlarged by the first selecting sub-module.

The first marking module 118 may be configured to mark the remaining N−1 human faces in the N human faces that have not yet been amplified or enlarged, and select one of the human faces from the remaining N−1 human faces based on the markings. The human face selected from the N−1 human faces may be enlarged, according to the markings, in the next amplification or enlargement and display process cycle. This process may be repeated for any number the N human faces.

In operation when an image captured by the camera 1000 includes N human faces, the first selecting sub-module 120 may select one of the N human faces to be enlarged. The first enlarging sub-module 121 may enlarge the selected human face and an image of the enlarged human face may be displayed as a preview image on the camera display screen. The first marking module 18 may mark the N human faces that were not enlarged. Based on the markings, one human face from the remaining N−1 human faces that was not yet selected to be enlarged, may be enlarged and displayed in another or next enlarging and displaying cycle. After N cycles or iterations of facial enlargement and display, each of the N faces from the full scene original captured image may have been presented enlarged to the viewers, and each of the people depicted in the image may have had a chance for improved viewing of his or her face prior to taking or recording a photo.

Figure 11:
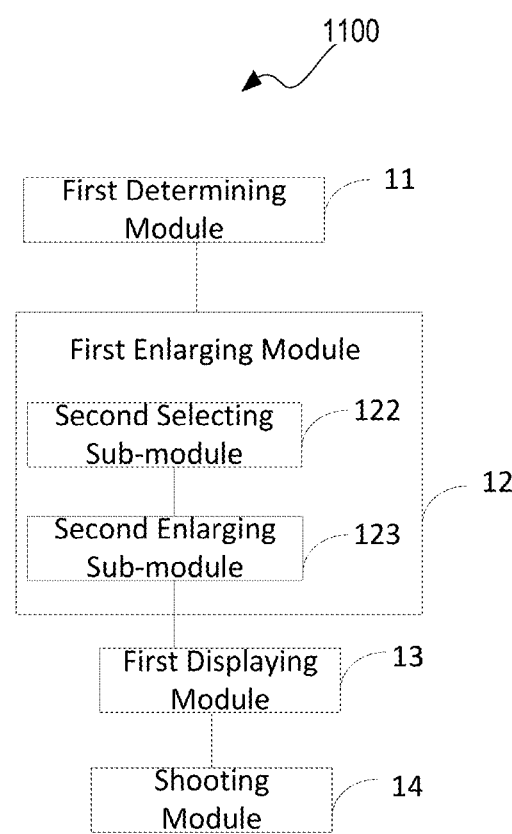
FIG. 11 is a block view of an exemplary preview image display apparatus according to an embodiment of the disclosure.

FIG. 11 is a block view of an exemplary preview image display apparatus according to an embodiment of the disclosure. In this embodiment, the image captured by the camera in the second duration includes N human faces, N being a positive integer greater than or equal to 2. Referring to FIG. 11, there is shown an apparatus or camera 1100 that may be similar or substantially the same as any of the apparatuses 700, 800, 900 and 1000 described with respect to FIGS. 7, 8, 9 and 10. The camera 1100 may further include a second selecting sub-module 122 and a second enlarging sub-module 122. In some embodiments, the first enlarging module 12 may include the second selecting sub-module 122 and the second enlarging sub-module 122

In some embodiments, an image captured by the camera 1100 may include a plurality of N human faces, as determined by the first determining module 11, where N is a positive integer greater than or equal to 2.

The second selecting sub-module 122 may be configured to select one of the N human faces, which occupies the largest or relatively largest spatial area, as a human face to be amplified or enlarged.

The second amplifying or enlarging sub-module 123 may be configured to amplify or enlarge the human face selected by the second selecting sub-module 122.

Similar to the description with respect to FIG. 7, the first displaying module 13 may display an image of the human face enlarged by the second enlarging sub-module 123 as a preview image on the display screen of the camera 1100.

In some embodiments the third displaying module may display the image captured by the camera 1100 as a preview image and the shooting module 14 may be configured to shoot the image captured by the camera 1100 in response to a shooting instruction.

Figure 12:
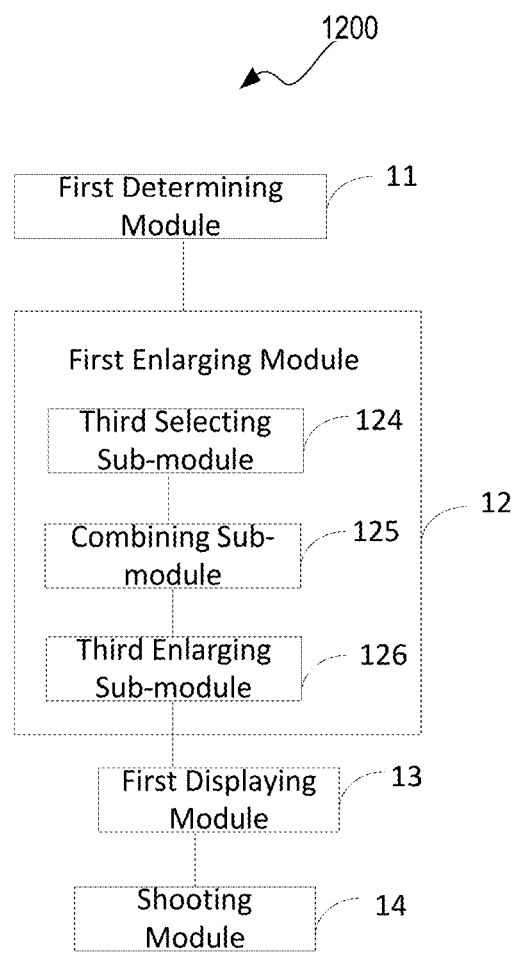
FIG. 12 is a block view of a preview image display apparatus according to an exemplary embodiment of the disclosure.

FIG. 12 is a block view of an exemplary preview image display apparatus according to an embodiment of the disclosure. Referring to FIG. 12 there is shown an apparatus 1200. The apparatus 1200 may be based on the apparatus shown in FIG. 7, that may be similar or substantially the same as any of the apparatuses 700, 800, 900, 1000 and 1100 described with respect to FIGS. 7, 8, 9, 10 and 11.

The camera 1200 may include the first enlarging module 12 that may further include a third selecting sub-module 124, a combining sub-module 125 and a third enlarging module 126.

In this embodiment, an image captured by the camera in a second duration may include N human faces, N being a positive integer greater than or equal to two. The N human faces may be determined by the first determining module 11.

The third selecting sub-module 124 may be configured to select M of the N human faces, which have relatively large spatial areas, as faces to be enlarged. The M human faces may be selected based on their relative spatial areas. In one exemplary embodiment, the area of a face may be represented by two points (x1, y1) on the left and (x2, y2) on the right bottom side of a rectangle defined about a face. However, the disclosure is not limited in this regard and any suitable representation may be utilized.

The combining sub-module 125 may be configured to combine the M human faces to be enlarged into one image.

The third enlarging sub-module 126 may be configured to enlarge the human faces in the image combined by the combining sub-module 125.

In operation, when an image captured by the camera 1200 includes N human faces, M of the N human faces that have relatively large spatial areas may be selected by the third selecting module 124 to be enlarged. The M selected human faces may be combined into one image by the combining sub-module 125 and the M faces in the combined image may be enlarged by the enlarging sub-module 126. An image of the combined and enlarged M faces may be displayed as a preview image on the camera display screen. In instances when there are many human faces in an image, if each face were to be enlarged one at a time it would take a long time to process. By applying this method of enlarging and combining M human faces that have relatively large spatial areas from the original captured image, the time for displaying a preview image and the presentation of the detail in faces may be improved.

Figure 13:
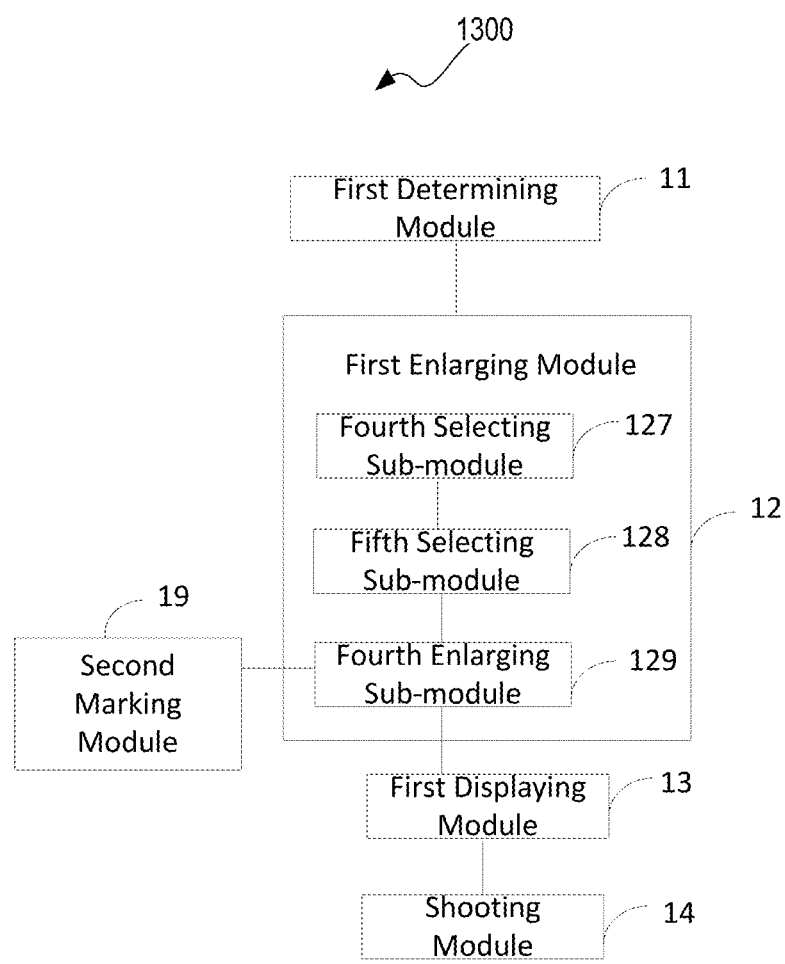
FIG. 13 is a block view of an exemplary preview image display apparatus according to an embodiment of the disclosure.

FIG. 13 is a block view of an exemplary preview image display apparatus according to an embodiment of the disclosure. In this embodiment, the image captured by the camera in the second duration includes N human faces, N being a positive integer greater than or equal to 2. Referring to FIG. 13, there is shown an apparatus or camera 1300, that may be similar or substantially the same as any of the apparatuses 700, 800, 900, 1000, 1100 and 1200 described with respect to FIGS. 7, 8, 9, 10, 11 and 12.

The camera 1300 may include the first enlarging module 12 that may further include a fourth selecting sub-module 127, a fifth selecting sub-module 128, a fourth enlarging sub-module 129 and a second marking module 19.

In some embodiments, it may be determined by the first determining module 11 that an image captured by the camera 1300 may include N human faces, where N is a positive integer greater than or equal to 2.

The fourth selecting sub-module 127 may be configured to select M of the N human faces that have relatively large spatial areas based on the areas of the human faces.

The fifth selecting sub-module 128 may be configured to select one of the M human faces as a human face to be enlarged.

The fourth enlarging sub-module 129 may be configured to amplify or enlarge the human face to be amplified or enlarged and selected by the fifth selecting sub-module 128.

The second marking module 19 may be configured to mark the human faces in the M human faces, which have not yet been amplified or enlarged, such that one human face may be selected from the remaining M−1 human faces according to the markings, and may be amplified or enlarged during another or a next cycle of the enlargement and display process.

In operation when an image captured by a camera 1300 includes N human faces that may be detected by the first determining module 11, the fourth selecting sub-module 127 may select M of the N human faces that have relatively large areas based on the areas of the human faces. The fifth selecting sub-module 128 may select one of the M selected faces to be enlarged and the fourth enlarging module may enlarge the selected one of the M faces. The first displaying module 13 may display an image of the enlarged human face as a preview image on the camera display screen. The second marking module 19 may mark the remaining M human faces that were not enlarged. Based on the markings, in a second cycle the fifth selecting module 128 may select one human face from the remaining M−1 human faces that have not yet been selected to be enlarged and display it as a preview image. After M cycles or iterations of facial enlargement and display have been processed, each of the M faces that have relatively large spatial areas from the full original captured image may have been presented enlarged to the viewers prior to taking or recording a photo.

With respect to the preview image display apparatus described with respect to the FIGS. 7-13, some procedures for performing operations by individual modules have been described in detail in the embodiments regarding the steps of the preview image display method, which may not be repeated here.

Figure 14:
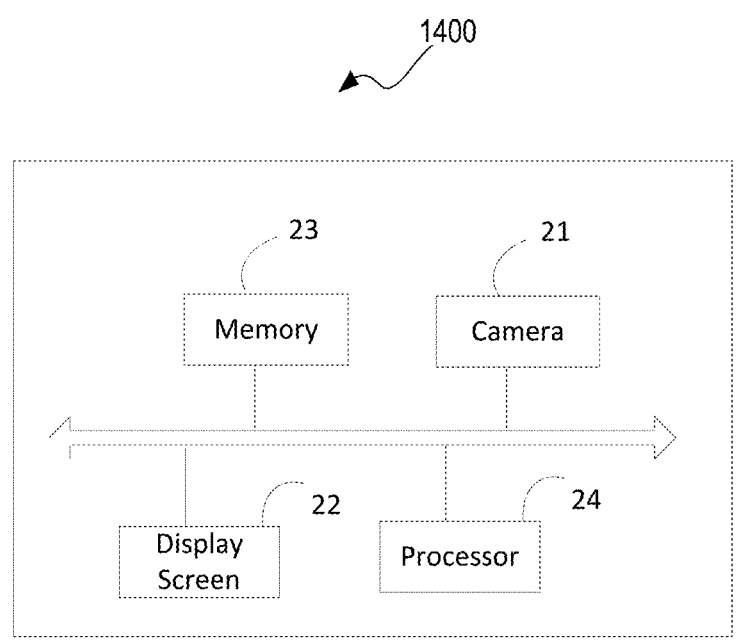
FIG. 14 is a block view of an exemplary terminal device according to an embodiment of the disclosure.

FIG. 14 is a block view of a terminal device according to an exemplary embodiment of the disclosure. As shown in FIG. 14, a terminal device 1400 may include a camera 21, a display screen 22, a memory 23 and a processor 24.

The camera 21 may comprise any suitable optical system and image sensor for capturing images, and may be operable to process image data for storage and/or display.

The memory 23 is may be configured to store instructions executable by the processor 24, the camera 21, the display screen 22 and the memory 23, which may be connected to and communicate with the memory 23 and the processor 24 via a system bus. The memory 23 may include a read-only memory (ROM), a random access memory (RAM), a flash memory, a hard disc or a solid-state hard disc. The memory may be operable to store preview image display screen data for captured images and for enlargements of faces detected in the captured images.

The processor 24 may be a central processing unit (CPU), a general processor, a digital signal processor (DSP), an application specific integrated circuit (ASIC) or the like. In some embodiments, the general processor 24 may be a microprocessor or any one of a conventional processor. The processor 24 may be configured to determine that an image captured by the camera 21 during a first time duration includes a human face. The processor may enlarge the human face during a second time duration that may be continuous with the first duration. The processor 24 may display an image of the enlarged human face as a preview image on the display screen 22. The processor 24 may receive a shooting instruction and shoot an image captured by the camera in response to the shooting instruction.

The steps of the methods disclosed by the embodiments of this invention may be executed by hardware processor modules or by a combination of hardware and software modules of the processor.

Figure 15:
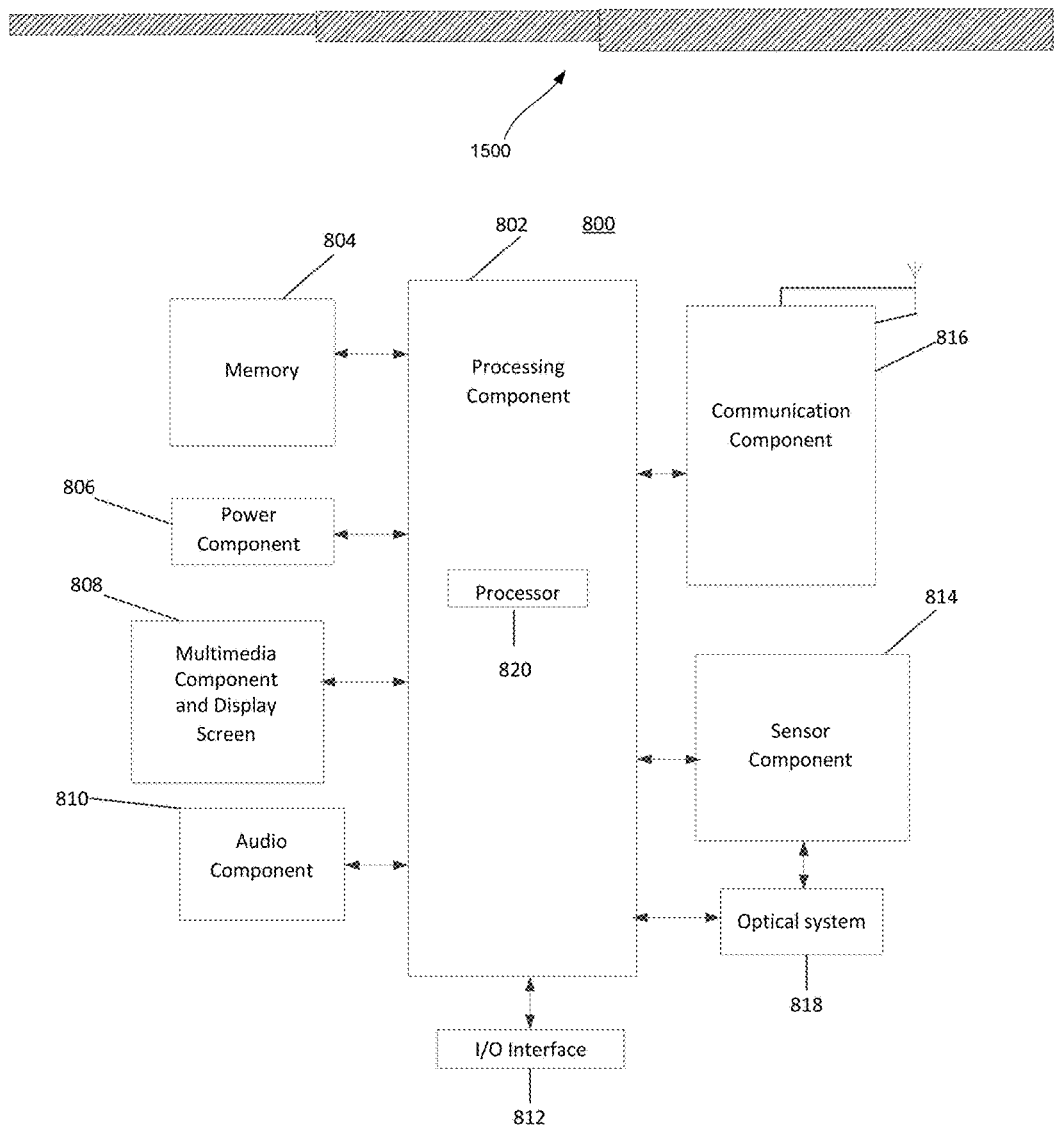
FIG. 15 is a block view of an exemplary terminal device according to an embodiment of the disclosure.

FIG. 15 is a block view of a terminal device and a selfie stick according to an exemplary embodiment of the disclosure. The terminal device 800 may be, for example, a mobile phone, a digital camera, a video camera, a computer, a digital broadcasting device, a messaging device, a game console, a tablet, a medical device, fitness equipment, a personal digital assistant or the like. However, the disclosure is not limited to any specific type of device and any suitable device may be utilized. The terminal device 800 may be similar or substantially the same as the apparatuses 700, 800, 900, 1000, 1100, 1200 and 1300.

In some embodiments, the terminal device 800 may be operable to attach to a selfie stick 1500 and may be operable to communicate with the selfie stick 1500 or detect when the selfie stick 1500 is attached. However, the disclosure is not limited in this regard. The selfie stick may be extendable or of a length such that the terminal 800 may be positioned at a distance from the user of the terminal 800. The selfie stick 1500 may enable a user to take a "selfie" picture or another photograph or video at an increased distance from their body in order to capture a scene or composition from the increased distance using the terminal device 800.

The terminal device 800 may comprise one or more of the following components: a processing component 802, a memory device 804, a power component 806, a multimedia component 808, an audio component 810, an input/output (I/O) interface 812, a sensor component 814, an optical system 818 and a communication component 816.

The processing component 802 may controls overall operations of the terminal device 800, such as the operations associated with image display, audio communication, telephone calls, data communications, camera operations, and recording operations. The processing component 802 may include one or more processors 820 to execute instructions to perform all or part of the steps in the above described methods. Moreover, the processing component 802 may include one or more modules which that facilitate the interaction between the processing component 802 and the other components shown in FIG. 1A5. For instance, the processing component 802 may include a multimedia module to facilitate the interaction between the multimedia component 808 and the processing component 802. The processing component 802 may include one or more hardware and/or software modules and sub-modules described with respect to FIGS. 7 through 13.

The memory 804 may be configured to store various types of data to support the operation of the terminal device 800. The memory 804 may be operable to store data instructions that include captured image data, facial detection or recognition data, facial enlargement data, facial spatial area data, facial marking data and image preview data. Further examples of data that may be stored in the memory 804 may include instructions for any applications or methods operated on the terminal device 800, contact data, phonebook data, messages, pictures, video, etc. The memory 804 may be implemented using volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 806 may provide power to various components of the terminal device 800. The power component 806 may include a power supply management system, one or more power sources, and any other components associated with the generation, management, and distribution of power in the terminal device 800.

The multimedia component 808 may include a display screen providing an output interface between the terminal device 800 and the user. In some embodiments, the screen may include a liquid crystal display (LCD) and a touch panel (TP). If the screen includes the touch panel, the screen may be implemented as a touch screen to receive input signals from the user, for example, for inputting shooting instructions. The touch panel may include one or more touch sensors to sense touches, swipes, and gestures on the touch panel. The touch sensors may not only sense a boundary of a touch or swipe action, but may also sense a period of time and a pressure associated with the touch or swipe action. In some embodiments, the multimedia component 808 may include a front camera and/or a rear camera. The front camera and/or the rear camera may receive an external multimedia datum while the terminal device 800 is in an operation mode, such as a photographing mode, a video mode or an image preview or alternate preview mode. Each of the front camera and the rear camera may include a fixed optical lens system or have focus and optical zoom capability.

The audio component 810 may be configured to output and/or input audio signals. For example, the audio component 810 may include a microphone (MIC) configured to receive an external audio signal when the terminal device 800 is in an operation mode, such as a call mode, a recording mode, and a voice recognition mode. The received audio signal may be further stored in the memory 804 or transmitted via the communication component 816. In some embodiments, the audio component 810 further includes a speaker to output audio signals.

The I/O interface 812 provides an interface between the processing component 802 and peripheral interface modules, such as a keyboard, a printer, a click wheel, buttons, and the like. The buttons may include, but are not limited to, a photograph shooting button, a video shooting button, a home button, a volume button, a starting button, and a locking button.

The sensor component 814 may include one or more sensors to provide status assessments of various aspects of the terminal device 800. For instance, the sensor component 814 may detect an open/closed status of the terminal device 800, relative positioning of components, e.g., the display and the keypad, of the terminal device 800, a change in position of the terminal device 800 or a component of the terminal device 800, a presence or absence of user contact with the terminal device 800, an orientation or an acceleration/deceleration of the terminal device 800, and a change in temperature of the terminal device 800. The sensor component 814 may include a proximity sensor configured to detect the presence of nearby objects or persons without any physical contact. The sensor component 814 may also include a light sensor, such as a CMOS or CCD image sensor, for use in the image capture and other imaging applications. In some embodiments, the sensor component 814 may also include an accelerometer sensor, a gyroscope sensor, a magnetic sensor, a pressure sensor, or a temperature sensor. The sensor component 814 may be operable to detect faces in an image and determine the number faces in a captured image.

The communication component 816 may be configured to facilitate communication, wired or wirelessly, between the terminal device 800 and other devices, for example, the selfie stick 1500. The terminal device 800 may access a wireless network based on a communication standard, such as WiFi, 2G, or 3G, or a combination thereof. In one exemplary embodiment, the communication component 816 receives a broadcast signal or broadcast associated information from an external broadcast management system via a broadcast channel. In one exemplary embodiment, the communication component 816 further includes a near field communication (NFC) module to facilitate short-range communications, for example, with a selfie stick. For example, the NFC module may be implemented based on a radio frequency identification (RFID) technology, an infrared data association (IrDA) technology, an ultra-wideband (UWB) technology, a Bluetooth (BT) technology, and other technologies. In some embodiments, the communication component 816 may communicate with the selfie stick 1500 via Bluetooth technology.

In exemplary embodiments, the terminal device 800 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described methods shown in the embodiments in FIGS. 1-6.

The exemplary embodiments may also provide a non-volatile computer-readable storage medium including instructions, such as the memory 804 containing instructions that may be executed by the processing component 820 of the terminal device 800 to perform the above methods shown in the embodiments in FIGS. 1-6. For example, the non-volatile computer-readable storage medium may be a ROM, a RAM, a CD-ROM, a tape, a floppy disc, an optical data storage device or the like.

Each module or unit discussed above for FIGS. 7-15, such as the determining modules, the enlarging modules and submodules, the displaying modules, the shooting modules, the selecting sub-modules, the marking modules and the combining sub-module, may take the form of a packaged functional hardware unit designed for use with other components, a portion of a program code (e.g., software or firmware) executable by the processor 820 or the processing circuitry that usually performs a particular function of related functions, or a self-contained hardware or software component that interfaces with a larger system, for example.

The illustrations of the embodiments described herein are intended to provide a general understanding of the structure of the various embodiments. The illustrations are not intended to serve as a complete description of all of the elements and features of apparatus and systems that utilize the structures or methods described herein. Other embodiments of the disclosure will be apparent to those skilled in the art from consideration of the specification and practice of the embodiments disclosed herein. This application is intended to cover any variations, uses, or adaptations of the disclosure following the general principles thereof and including such departures from the present disclosure as come within known or customary practice in the art. It is intended that the specification and examples are considered as exemplary only, with a true scope and spirit of the invention being indicated by the following claims in addition to the disclosure.

It will be appreciated that the present invention is not limited to the exact construction that has been described above and illustrated in the accompanying drawings, and that various modifications and changes can be made without departing from the scope thereof. It is intended that the scope of the invention only be limited by the appended claims.

We claim:

1. A preview image display method, the method comprising:
capturing a first image by a camera during a first time duration;
determining whether the first image includes a first human face;
in response to the determining that the first image includes the first human face:
capturing a second image including a second human face during a second time duration, wherein the second time duration is continuous with the first time duration,
enlarging the second human face of the second image, and
displaying the enlarged second human face on a display screen;
in response to the determining that the first image does not include the first human face:
capturing the second image by the camera during the second time duration, and
displaying the second image on the display screen;
after the second time duration ends, capturing a third image by the camera during a third time duration, wherein the third duration is continuous with the second time duration;
displaying the third image on the display screen, wherein the third image is an image of original scale; and
when receiving an image capture instruction, shooting a fourth image captured by the camera in response to the shooting instruction.

2. The method according to claim 1, wherein when the second image captured by the camera during the second time duration includes N human faces, N being a positive integer greater than or equal to 2, wherein the enlarging the second human face from the second image captured by the camera during the second time duration comprises:
selecting one of the N human faces as the second human face to be enlarged; and
enlarging the selected one of the N human faces; and
marking remaining human faces of the N human faces that are not enlarged, selecting a next human face from the remaining human faces according to the marking, and enlarging the selected next human face, during a next enlargement process.

3. The method according to claim 1, wherein when the second image captured by the camera during the second time duration includes N human faces, N being a positive integer greater than or equal to 2, wherein the enlarging the second human face from the second image captured by the camera during the second time duration comprises:
selecting, as the second human face to be enlarged, one of the N human faces having a largest spatial area; and
enlarging the selected one of the N human faces.

4. The method according to claim 1, wherein when the second image captured by the camera during the second time duration includes N human faces, N being a positive integer greater than or equal to 2, wherein the enlarging the second human face from the second image captured by the camera during the second time duration comprises:
selecting M of the N human faces that have relatively large spatial areas as human faces to be enlarged based on the spatial areas of the N human faces;
combining the M human faces to be enlarged into one image, and enlarging the M human faces in the combined image.

5. The method according to claim 1, wherein when the second image captured by the camera during the second time duration includes N human faces, N being a positive integer greater than or equal to 2, wherein the enlarging the second human face from the second image captured by the camera during the second time duration comprises:
selecting M of the N human faces that have relatively large spatial areas based on the spatial areas of the N human faces;
selecting one of the M human faces as the second human face to be enlarged; and
enlarging the selected one of the M human faces; and
marking the remaining M−1 human faces in the M human faces that are not enlarged, such that one human face is selected from the remaining M−1 human faces and is enlarged according to the marking during a next enlargement process.

6. A terminal device, the terminal device comprising:
a camera configured to capture an image;
a display screen configured to display the image;
a processor; and
a memory storing instructions executable by the processor,
wherein the processor when executing the instructions is configured to:
capture a first image by the camera during a first time duration,
determine whether the first image includes a first human face,
in response to the determining that the first image includes the first human face:
capture a second image including a second human face during a second time duration, wherein the second time duration is continuous with the first time duration,
enlarge the second human face of the second image, and
display the enlarged second human face on the display screen,
in response to the determining that the first image does not include the first human face:
capture the second image by the camera during the second time duration, and
display the second image on the display screen,
after the second time duration ends, capture a third image by the camera during a third time duration, wherein the third duration is continuous with the second time duration,
displaying the third image on the display screen, wherein the third image is an image of original scale, and
when the terminal device receives a shooting instruction, shoot a fourth image captured by the camera according to the shooting instruction.

7. The terminal device according to claim 6, wherein when the second image captured by the camera during the second time duration includes N human faces, N being a positive integer greater than or equal to 2, the processor when executing the instructions is further configured to:
select one of the N human faces as the second human face to be enlarged; and
enlarge the selected second human face; and
mark the remaining N−1 human faces in the N human faces that are not enlarged, such that one human face is selected from the remaining N−1 human faces that are not yet selected to be enlarged, and is enlarged according to the marking during a next enlargement process.

8. The terminal device according to claim 6, wherein when the second image captured by the camera during the second time duration includes N human faces, N being a positive integer greater than or equal to 2, the processor when executing the instructions is further configured to:
select one of the N human faces that has the largest area as the second human face to be enlarged; and
enlarge the selected second human face.

9. The terminal device according to claim 6, wherein when the second image captured by the camera during the second time duration includes N human faces, N being a positive integer greater than or equal to 2, the processor when executing the instructions is further configured to:
select M of the N human faces that have relatively large spatial areas, as human faces to be enlarged based on the spatial areas of the N human faces;
combine the selected M human faces into one image, and enlarge the selected M human faces in the combined image.

10. The terminal device according to claim 6, wherein when the second image captured by the camera during the second time duration includes N human faces, N being a positive integer greater than or equal to 2, the processor when executing the instructions is further configured to:
select M of the N human faces that have relatively large spatial areas based on the spatial areas of the N human faces;
select one of the M human faces as the second human face to be enlarged;
enlarge the selected one of the M human faces; and
mark the remaining M−1 human faces in the M human faces that are not enlarged, such that one human face is selected from the remaining M−1 human faces and enlarged according to the marking in a next enlargement process.

11. A non-transitory computer-readable storage medium having stored thereon computer program instructions that, when executed by a processor of a mobile terminal, cause the mobile terminal to:
capture a first image by a camera during a first time duration;
determine whether the first image includes a first human face;
in response to the determining that the first image includes the first human face:

capture a second image including a second human face during a second time duration, wherein the second time duration is continuous with the first time duration, enlarge the second human face of the second image, and display the enlarged second human face on a display screen;

in response to the determining that the first image does not include the first human face:

capture the second image by the camera during the second time duration, and display the second image on the display screen;

after the second time duration ends, capture a third image by the camera during a third time duration, wherein the third duration is continuous with the second time duration;

displaying the third image on the display screen, wherein the third image is an image of original scale; and when a shooting instruction is received, shoot a fourth image captured by the camera in response to the shooting instruction.

12. The non-transitory computer-readable storage medium of claim 11, wherein when the second image captured by the camera during the second time duration includes N human faces, N being a positive integer greater than or equal to 2, the computer program instructions further comprise instructions that cause the mobile terminal to:

select one of the N human faces as the second human face to be enlarged; and enlarge the selected second human face; and mark the remaining N−1 human faces in the N human faces that are not enlarged, such that one human face is selected from the remaining N−1 human and is enlarged according to the marking during a next enlargement process.

13. The non-transitory computer-readable storage medium of claim 11, wherein when the second image captured by the camera during the second time duration includes N human faces, N being a positive integer greater than or equal to 2, the computer program instructions further comprise instructions that cause the mobile terminal to:

select one of the N human faces that has the largest spatial area as the second human face to be enlarged; and enlarge the selected second human face selected.

14. The non-transitory computer-readable storage medium of claim 11, wherein when the second image captured by the camera during the second time duration includes N human faces, N being a positive integer greater than or equal to 2, the computer program instructions further comprise instructions that cause the mobile terminal to:

select M of the N human faces that have relatively large spatial areas as human faces to be enlarged based on the spatial areas of the N human faces;

combine the selected M human faces into one image, and enlarge the selected M human faces in the combined image.

\* \* \* \* \*